United States Patent [19]
MacDonald et al.

[11] Patent Number: 5,911,021
[45] Date of Patent: Jun. 8, 1999

[54] SUBASSEMBLY AND METHOD FOR COUPLING OPTICAL DEVICES

[75] Inventors: William Michael MacDonald, Lebanon; Yiu-Huen Wong, Summit, both of N.J.

[73] Assignee: Lucent Technologies Inc., Murray Hill, N.J.

[21] Appl. No.: 08/831,169

[22] Filed: Apr. 2, 1997

[51] Int. Cl.⁶ .................................................. G02B 6/32
[52] U.S. Cl. ............................. 385/35; 385/52; 385/65; 385/93
[58] Field of Search ............................. 385/35, 31, 33, 385/34, 51, 52, 39, 65, 83, 82, 93, 14; 359/19, 131, 356, 642, 664, 718, 719, 799, 811, 819

[56] References Cited

U.S. PATENT DOCUMENTS

| | | | |
|---|---|---|---|
| 4,588,263 | 5/1986 | Cohen et al. | 350/401 |
| 4,611,883 | 9/1986 | Myer | 385/14 |
| 4,978,189 | 12/1990 | Blonder et al. | 350/96.12 |
| 5,073,003 | 12/1991 | Clark | 385/33 |
| 5,638,475 | 6/1997 | Gaebe | 385/93 |
| 5,771,323 | 6/1998 | Trott | 385/35 |

FOREIGN PATENT DOCUMENTS

| | | | |
|---|---|---|---|
| 0395854 | 3/1990 | European Pat. Off. | G02B 6/42 |
| 0826995 | 3/1998 | European Pat. Off. | G02B 6/42 |
| 3809396 | 10/1989 | Germany | G02B 6/42 |

OTHER PUBLICATIONS

R. A. Boudreau, *Optoelectronic Packaging* . . . , Lasers and Electro–Optics Society Meeting Conference Proceedings, vol. 2, pp. 354–357 (1990).

C. Strandman et al., *Fabrication of 45° Mirror* . . . , J. Microelectromechanical Systems, vol. 4, No. 4, pp. 213–219 (1995).

*Primary Examiner*—John D. Lee
*Assistant Examiner*—Ellen E. Kang
*Attorney, Agent, or Firm*—E. E. Pacher

[57] ABSTRACT

A subassembly for coupling a laser to an optical fiber comprises a substrate having an asymmetrical, pyramidal cavity, a spherical lens located in the cavity, and a semiconductor laser positioned on the substrate. The output face of the laser is located along an edge of the cavity (without overhanging the edge), and its active region is aligned with the center of the lens along the optic axis of the subassembly.

12 Claims, 2 Drawing Sheets

SUBASSEMBLY AND METHOD FOR COUPLING OPTICAL DEVICES

FIELD OF THE INVENTION

This invention relates generally to optical communication systems and, more particularly, to a subassembly and method for coupling optical devices to one another, especially for coupling a semiconductor laser through a lens to an optical fiber.

BACKGROUND OF THE INVENTION

In the field of optical communication systems the source of an optical signal, such as a laser, is often coupled to a utilization device, such as an optical waveguide (integrated or fiber optic), a photodetector, a modulator, a fiber amplifier, an optical isolator, or a combination of such devices, by means of a lens arrangement. The latter may include a single lens or multiple lenses, and the lenses themselves may take on a variety of shapes such as spherical, aspherical, cylindrical, graded index (GRIN), etc. A typical design positions a spherical lens between the output face of the laser and the input face of an optical fiber, with these faces being located so as to efficiently couple light to and from the lens. Inasmuch as the position of these components relative to one another is critical, often measured in terms of a micrometer or less, one aspect of the prior art locates devices in etched precision features (e.g., grooves, cavities) formed by crystallographic planes in single crystal silicon substrates to meet the necessary alignment tolerances. This prior art technology is known as silicon optical bench (SiOB) technology. For an illustration of the use of spherical lenses disposed in pyramidal cavities, see, for example, U.S. Pat. No. 4,978,189 granted in 1990 to G. E. Blonder et al and assigned to the assignee hereof.

Of particular interest is the prior art SiOB confocal coupling arrangement shown in FIGS. 3&4. In this design a symmetrical, pyramidal cavity 3 is etched into the top major surface of a <100>-oriented Si substrate 1. The side walls of the cavity are formed by <111>-oriented crystallographic planes which make an angle of 54.7° with the (100) plane. A spherical sapphire lens 5 is positioned in the cavity, and a semiconductor laser 7 is located on the top surface of the substrate, the output facet of the laser being located so as to efficiently couple light to the lens. Because the output beam of such a laser often has a wide divergence angle, efficient coupling requires that the laser be positioned in close proximity to the lens, i.e., at a distance not greater than the focal length of the lens. Because the focal point falls in the gap between the edge of the cavity and the surface of the lens, the laser typically overhangs the edge of the cavity in order to satisfy the focal length requirement. In many designs of this type as much as a quarter or a third of the laser length may overhang the edge. This overhang is a problem because the substrate is not just as a mechanical support; it is also a heat sink. Consequently, the overhanging portion of the laser may not be adequately thermally coupled to the substrate and may overheat, adversely affecting laser performance or lifetime.

Thus, a need remains in the art for a SiOB coupling arrangement which essentially eliminates the need for the laser to overhang the edge of the cavity and thus removes this source of unreliability.

SUMMARY OF THE INVENTION

One aspect of our invention is a subassembly for coupling optical devices to one another, such as a semiconductor laser to a utilization device. A lens is positioned in an asymmetric cavity in a substrate, with the asymmetry of the cavity being designed to allow the laser to be efficiently coupled to the lens without having to overhang the edge of the cavity; i.e., the laser may be positioned flush with the edge or slightly setback from it.

In accordance with another aspect of our invention, the asymmetry of the cavity is realized by etching the cavity in a surface of a single crystal semiconductor substrate, the surface being slightly misoriented from a major crystallographic plane. Preferably, the substrate is Si and the surface is misoriented from the <100> direction by a relatively small angle. The size of the angle is related to the size and refractive index of the lens, and other design considerations.

BRIEF DESCRIPTION OF THE DRAWINGS

Our invention, together with it various features and advantages, can be readily understood from the following more detailed description taken in conjunction with the accompanying drawing, in which:

These graphs are illustrative of the general relationships between these parameters (which can readily be calculated by those skilled in the art), even though FIG. 5 is plotted for a specific case where a spherical lens of diameter D=800 $\mu$m is located in an asymmetric cavity (in accordance with the invention), and the center of the lens is located at a height h=5 $\mu$m above the substrate surface (i.e., on the optic axis); and FIG. 6 is plotted for a specific case where a spherical lens is located in a symmetric prior art cavity, and the center of the lens of refractive index n=1.875 is also located at h=5 $\mu$m.

In the interests of clarity and simplicity FIGS. 1–4 have not been drawn to scale.

DETAILED DESCRIPTION OF THE INVENTION

Figure 1:
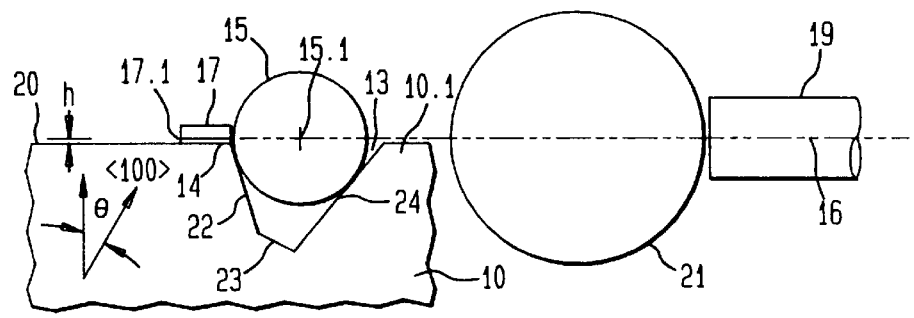
FIG. 1 is a schematic side view of a subassembly for coupling a semiconductor laser to an optical fiber in accordance with one embodiment of our invention.
Figure 2:
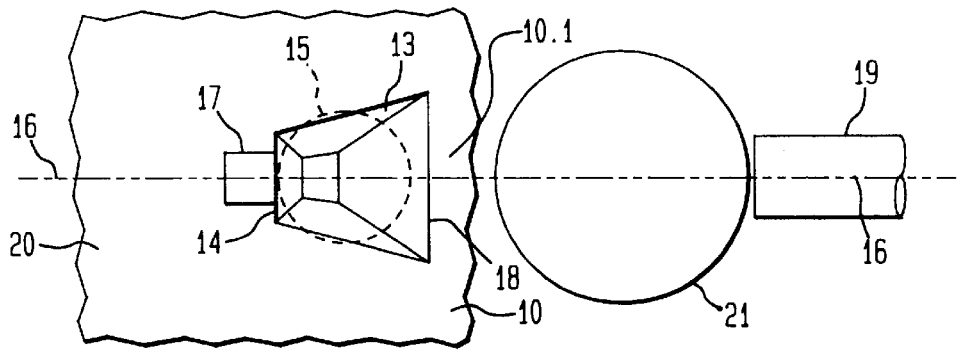
FIG. 2 is a top view of FIG. 1.

With reference now to FIGS. 1&2, a subassembly for coupling a semiconductor laser 17 to a utilization device comprises a substrate 10 having an asymmetrical cavity 13 adapted to receive a lens 15. A confocal lens arrangement of lenses 15 and 21 is depicted for purposes of illustration, but other designs, including single lens designs, are also suitable. The asymmetrical shape of the cavity is designed so that the laser can be efficiently coupled to the lens 15 without having to overhang the edge 14 of the cavity; i.e., as shown, the focal point of the lens is essentially at the edge 14 of cavity 13, and the output face of the laser 17 is positioned essentially flush with the edge 14. However, in some applications it may be acceptable to have the laser set back slightly from the edge 14 provided that refraction and/or absorption of the light beam by the substrate does not significantly reduce coupling efficiency.

Figure 3:
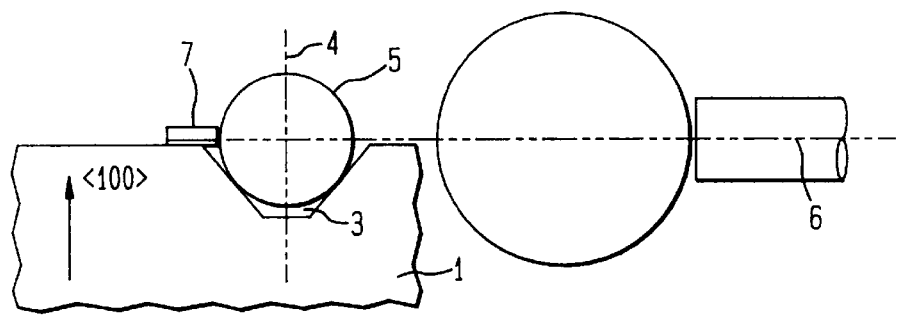
FIGS. 3&4 are, respectively, side and top views of a prior art confocal coupling arrangement.
Figure 4:
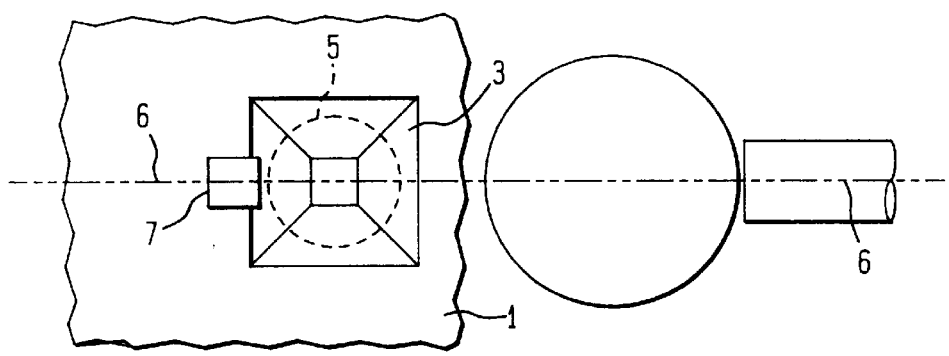

In contrast, in the prior art design of FIGS. 3&4 the focal point of the lens 5 typically falls in the gap between the edge of the cavity and the surface of the lens. Therefore, to obtain the desired coupling efficiency the prior art resorts to positioning the laser so that it overhangs the edge of the cavity. This problem is addressed by the asymmetric cavity design of our invention.

Figure 5:
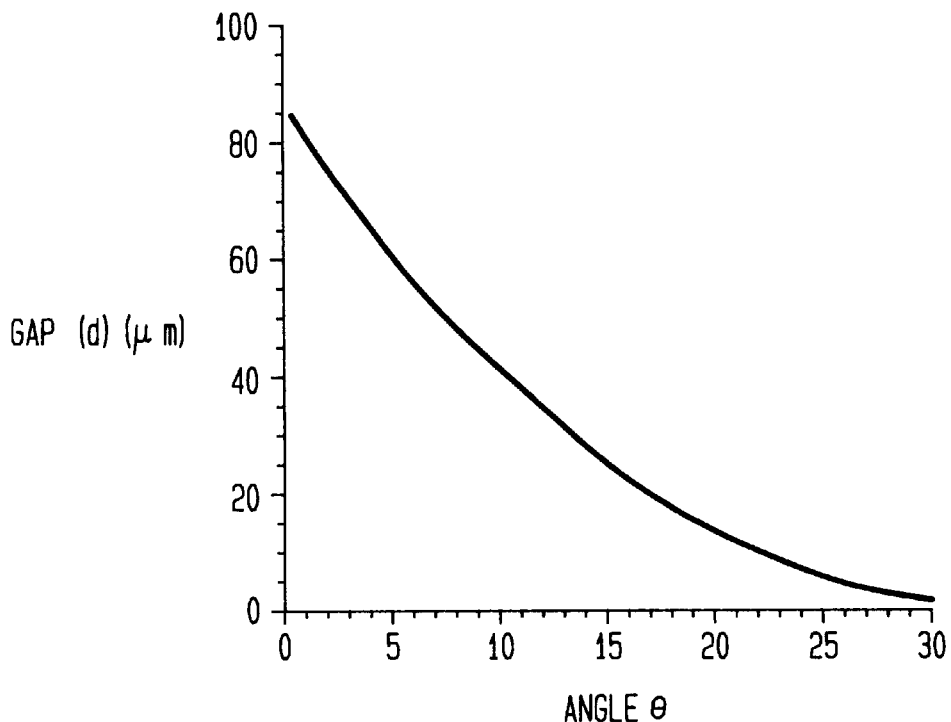
FIGS. 5 is graph of gap length (d) as a function of substrate misorientation angle (θ) in accordance with one embodiment of our invention.
Figure 6:
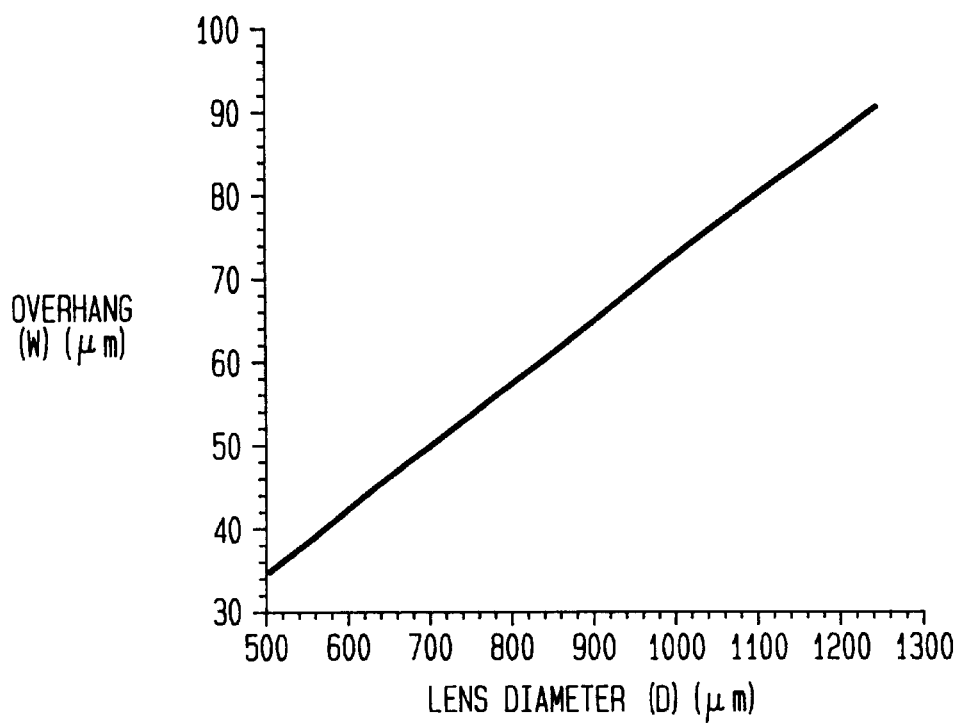
FIG. 6 is a graph of overhang (w) as a function of spherical lens diameter (D) for the case of a prior art symmetric cavity.

The asymmetric characteristics of the lens-carrying cavity 13 of our invention can be viewed from several perspectives, but consider first the symmetric nature of the prior art cavity 3 shown in FIGS. 3&4. It has an axis of symmetry 4 which is perpendicular to the longitudinal (i.e., optic) axis 6 between the laser 7 and the lens 5. In contrast, the asymmetric cavity 13 of our invention has no such axis of symmetry perpendicular to the longitudinal axis 16 of FIG. 2. As a consequence, the cavity 13 in accordance with one aspect of our invention has a first or upstream sidewall 22 which is inclined at a relatively steep angle and a second or downstream sidewall 24 which is inclined at a much shallower angle. This difference in the slopes of the two sidewalls, i.e., this asymmetry, enables the focal point of the lens to fall at the edge of the cavity rather than in the gap between the edge and the lens. Indeed, the prior art gap may be all but eliminated by appropriate choice of the substrate misorientation angle θ, as shown in FIG. 5. The latter feature allows the end (output) face of the laser to be located arbitrarily close to the lens (i.e., at or within its focal length) without overhanging the edge 14.

Another parameter which affects the coupling efficiency is the position of the lens center relative to the active region of the laser. As shown in FIG. 1, the center 15.1 and the active region 17.1 are preferably aligned along the optic axis 16. It should be noted that FIG. 1 depicts the active region 17.1 as being positioned relatively close to the substrate 10 (as compared to the midpoint of the laser thickness). This configuration is known as active-side-down mounting of the laser, which facilitates heat-sinking the laser. However, the laser could also be mounted active side up, which would place the active region relatively farther from the substrate and hence make heat sinking relatively less efficient.

The substrate can be made of a single material or layer, or may be a composite of several materials or layers, provided that the cavity can be formed to the desired dimensional specifications and tolerances. Thus, the substrate could be a plastic material or a single crystal semiconductor. The former might be preferred from an expense standpoint, but the latter is preferred from a dimensional control standpoint. In our invention, we prefer to use single crystal silicon, but unlike the prior art use of this material, we intentionally misorient the top surface from the (100) plane; that is, as shown in FIG. 1, the top surface 20 is oriented at a small angle θ to the <100> direction. The size of the angle controls the shape of the asymmetrical, pyramidal cavity that is formed; for example, in the case of a Si substrate, the upstream sidewall 22 is inclined at an angle of 54.7°+θ, whereas the downstream sidewall 24 is inclined at 54.7°−θ, and the bottom surface 23 is a (100) plane. This ability to control the cavity shape provides flexibility in that the cavity can be designed to receive different lenses; e.g., spherical lenses of different diameters (D) and or different refractive indices. Of course, other geometric shapes for the lens can also be utilized, such as cylindrical and aspherical, provided that the cavity can be formed to accommodate the different shapes.

As noted earlier, the laser beam is coupled through the lenses 15 and 21 to a utilization device such as an optical waveguide (integrated or fiber optic), a photodetector, a modulator, an optical amplifier, an optical isolator, etc. In the embodiment of FIGS. 1&2 the utilization device is depicted as an optical fiber 19 (only the core is shown) and is positioned so that its input face is located at the focal point of lens 21. The fiber may be a well-known pigtail coupled to a utilization device, and it may be mounted on a separate substrate (not shown); e.g., the fiber may be mounted in a V-groove etched in a separate silicon substrate to facilitate alignment with the lenses and laser. (Likewise, the lens 21 my be mounted on a separate substrate, or it my be mounted in a separate cavity in substrate 10.) The end (input) face of the fiber is shown for simplicity to be perpendicular to the longitudinal (optic) axis 16, but in practice it might oriented at an angle thereto in order to match the wavefront of the beam emerging from the lens into the fiber, as is well known in the art. the fiber end face could also be AR coated to reduce reflections which, again, is a technique well known in the art In the design of the subassembly consideration should be given to the refractivity and transparency of the substrate material to the laser radiation. Consider, for example, the portion 10.1 of the substrate is disposed between the lens 15 and the fiber 19. To reduce absorption and refraction of the laser radiation at least the portion 10.1 should either be made or transparent material (e.g., Si in case of lasers operating at about 1.1–1.6 μm), or should be shaped to remove the absorptive/refractive material (e.g., by etching a groove between the lens and the fiber).

EXAMPLE

This example describes the fabrication of a subassembly for coupling a semiconductor laser to a spherical lens. Specific parameters, materials, dimensions and operating characteristics are given by way of illustration only and, unless otherwise stated, are not to be construed as limiting the scope of the invention.

A single crystal, misoriented Si substrate was obtained from commercial sources; e.g., from Virginia Semiconductor, Blacksburg, Va. The as-purchased substrate was misoriented from the <100> direction by an angle of about 17°. As discussed later, this angle will provide an asymmetrical, pyramidal cavity suitable to carry a 800 μm diameter leaded glass, spherical lens commercially available from Schott Glass, Germany. A patterned mask (e.g., SiO$_2$ or SiN$_x$) was formed on the substrate so that an opening in the mask was positioned over the desired location of the asymmetrical, pyramidal cavity. Then the substrate was subjected to a standard wet chemical etchant (e.g., Ehteylenediamine Pyrocatechol known as EDP) for a suitable time (e.g., 10 hr. for EDP) resulting in a cavity having the following approximate dimensions: edge 14 was 823 μm long; edge 18 was 1057 μm long; edges 14 and 18 were separated from one another along the optic axis by 1021 μm; upstream sidewall 22 was inclined at 71.7° and downstream sidewall 24 was inclined at 3 7.7°. The depth of cavity 13 positioned the center of lens 15 at a height h=8 μm above the substrate surface; thus, the cavity was at least 392 μm deep.

An InP/InGaAsP 1.5 μm laser was bonded, using a Au-Sn solder, active-side-down to the top surface of the substrate. The output face of the laser was located essentially flush with the edge 14. Other lasers, such as InP/InGaAsP 1.3 μm lasers or GaAs/AlGaAs 0.98 μm lasers, could also be utilized. The spherical lens 15 was positioned in the cavity 13. The dimensions and shape of the cavity were such that the focal point of the lens was located essentially at the edge of the cavity and hence at the output facet of the laser. In addition, the active region of the laser and the center of the lens were located on the optic axis of the subassembly.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, our invention may be used in conjunction with a well-known back face monitor (not shown) e.g., a photodiode positioned on substrate 10 along axis 16 to receive light emerging from the rear facet of the laser. This type of monitor may be used to sense the output power of the laser and, via well-known feedback schemes, to control the operating point of the laser or to maintain its output power constant. Moreover, although we have described our invention in terms of the presently preferred use of silicon substrates, it will be apparent to those skilled in the are that other elemental semiconductors (e.g., Ge) or compound semiconductors (e.g., GaAs, InP) may also be suitable. However, compound semiconductors, such as the Group III–V materials, may provide a suitable asymmetric cavity without the need to misorient the substrate from a major crystallographic plane.

What is claimed is:

1. A subassembly for optically coupling first and second optical devices comprising
    a substrate having an asymmetrical cavity located therein,
    a discrete lens located in said cavity said cavity having first and second surfaces containing said lens, said first surface having a steeper slolpe than said second surface,
    said first device comprising a light beam emitter disposed on said substrate so that an output beam of said emitter is received by said lens, and
    said second device disposed to receive said beam as focused by said lens.
2. The invention of claim 1 wherein
    said first surface is located upstream of said of said second surface relative to said emitter.
3. The invention of claim 2 wherein
    said first surface of said cavity forms an edge with said major surface, and an output face of said emitter nearest said lens is located essentially flush with said edge.
4. The invention of claim 3 wherein
    said output face is located essentially at a position between the lens and its focal point.
5. The invention of claim 2 wherein
    said first surface of said cavity forms an edge with said major surface and an output face of said emitter nearest said lens is setback from said edge.
6. The invention of claim 1 wherein
    said emitter comprises a semiconductor laser, said second device comprises an optical fiber, and said lens comprises a spherical lens.
7. The invention of claim 6 wherein
    said laser has an active region which is aligned with the center of said lens.
8. The invention of claim 1 wherein
    said substrate comprises a single crystal semiconductor having a major surface in which said cavity is located, said surface being misoriented from a crystallographic plane by an angle θ.
9. The invention of claim 8 wherein
    said substrate comprises single crystal silicon, and said major surface is misoriented from the <100> direction by said angle θ.
10. An optical subassembly comprising
    a single crystal silicon substrate having a major surface misoriented from the <100> direction by an angle θ, said substrate having an asymmetrical, pyramidal cavity disposed in said surface, said cavity having first and second surfaces wherein said first surface has a steeper slope than said second surface, and said first surface intersects said major surface at an edge,
    a first spherical lens disposed in said cavity in contact with said first and second surfaces, the focal point of said first lens being located along said edge,
    a semiconductor laser disposed on said major surface so that the output face of said laser is located essentially flush with said edge, said laser having an active region aligned with the center of said first lens, and
    a second spherical lens disposed between said first lens and the input face of a utilization device,
    said input face being located essentially at the focal point of said second lens.
11. A method of fabricating an optical subassembly comprising the steps of
    providing a single crystal semiconductor substrate having a major surface misoriented from a <100>-oriented surface by an angle θ,
    forming an asymmetrical, pyramidal cavity in said major surface, said cavity and said major surface forming an edge,
    positioning a lens in said cavity so that the focal point of said lens lies along said edge, said cavity having first and second surfaces contacting said lens, said first surface having a steeper slope than said second surface, and
    disposing a semiconductor laser on said major surface so that an output face of said laser is essentially flush with said edge.
12. The method of claim 11 including the steps of
    positioning an optical fiber so that said lens focuses the output beam of said laser onto an input end of said fiber.

* * * * *